US012645244B2

(12) United States Patent
Katoh

(10) Patent No.: US 12,645,244 B2
(45) Date of Patent: Jun. 2, 2026

(54) BUTTON DEVICE AND ELECTRONIC DEVICE

(71) Applicant: CASIO COMPUTER CO., LTD., Tokyo (JP)

(72) Inventor: Hirokatsu Katoh, Kanagawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 297 days.

(21) Appl. No.: 18/326,251

(22) Filed: May 31, 2023

(65) Prior Publication Data

US 2023/0393604 A1 Dec. 7, 2023

(30) Foreign Application Priority Data

Jun. 1, 2022 (JP) ................................ 2022-089479

(51) Int. Cl.

| | |
|---|---|
| ***G05G 1/02*** | (2006.01) |
| ***H01H 13/04*** | (2006.01) |
| ***H01H 13/14*** | (2006.01) |

(52) U.S. Cl.

CPC ............... *G05G 1/02* (2013.01); *H01H 13/04* (2013.01); *H01H 13/14* (2013.01)

(58) Field of Classification Search

CPC ......... G05G 1/00–02; H01H 13/00–88; H01H 2221/058

USPC .................................................... 361/679.01

See application file for complete search history.

(56) References Cited

U.S. PATENT DOCUMENTS

| | | | | |
|---|---|---|---|---|
| 7,256,359 | B2 * | 8/2007 | Nishida | G10H 1/346 200/1 B |
| 7,498,537 | B1 * | 3/2009 | Duwel | H01H 13/705 200/517 |
| 2012/0147570 | A1 | 6/2012 | Yamazaki | |
| 2020/0152401 | A1 * | 5/2020 | Huang | H01H 13/14 |

FOREIGN PATENT DOCUMENTS

| | | | |
|---|---|---|---|
| JP | S50-58579 | A | 5/1975 |
| JP | 2003-281965 | A | 10/2003 |
| JP | 2006066157 | A * | 3/2006 |
| JP | 2012-128123 | A | 7/2012 |

OTHER PUBLICATIONS

Japanese Office Action dated May 7, 2024 in a counterpart Japanese patent application No. 2022-089479. (A machine translation (not reviewed for accuracy) attached.).

* cited by examiner

*Primary Examiner* — Imani N Hayman
*Assistant Examiner* — Ross Terry Mularski
(74) *Attorney, Agent, or Firm* — CHEN YOSHIMURA LLP

(57) ABSTRACT

A button device includes a substrate with a hole; a button cap arranged above the substrate in a position corresponding to the holes in the substrate; and a projecting portion protruding toward the button cap through the hole in the substrate.

10 Claims, 10 Drawing Sheets

BUTTON DEVICE AND ELECTRONIC DEVICE

BACKGROUND OF THE INVENTION

Technical Field

The present invention relates to button devices and electronic devices.

Background Art

Conventionally, electronic devices such as electronic keyboard instruments are provided with button devices such as power switches. For example, a button device as disclosed in Japanese Patent Application Laid-Open No. 2003-281965 is known.

SUMMARY OF THE INVENTION

One of the advantages of the present disclosure is to provide an easy-to-operate button device and an electronic device equipped with such a button device.

Features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides A button device, comprising: a substrate with a hole; a button cap arranged above the substrate in a position corresponding to the holes in the substrate; and a projecting portion protruding toward the button cap through the hole in the substrate.

An electronic device according to the present disclosure includes the above-described button device and an electronic device main body driven by an operation of the button device.

It is to be understood that both the foregoing general description and the following detailed description are exemplary and explanatory, and are intended to provide further explanation of the invention as claimed.

DETAILED DESCRIPTION OF EMBODIMENTS

Figure 1:
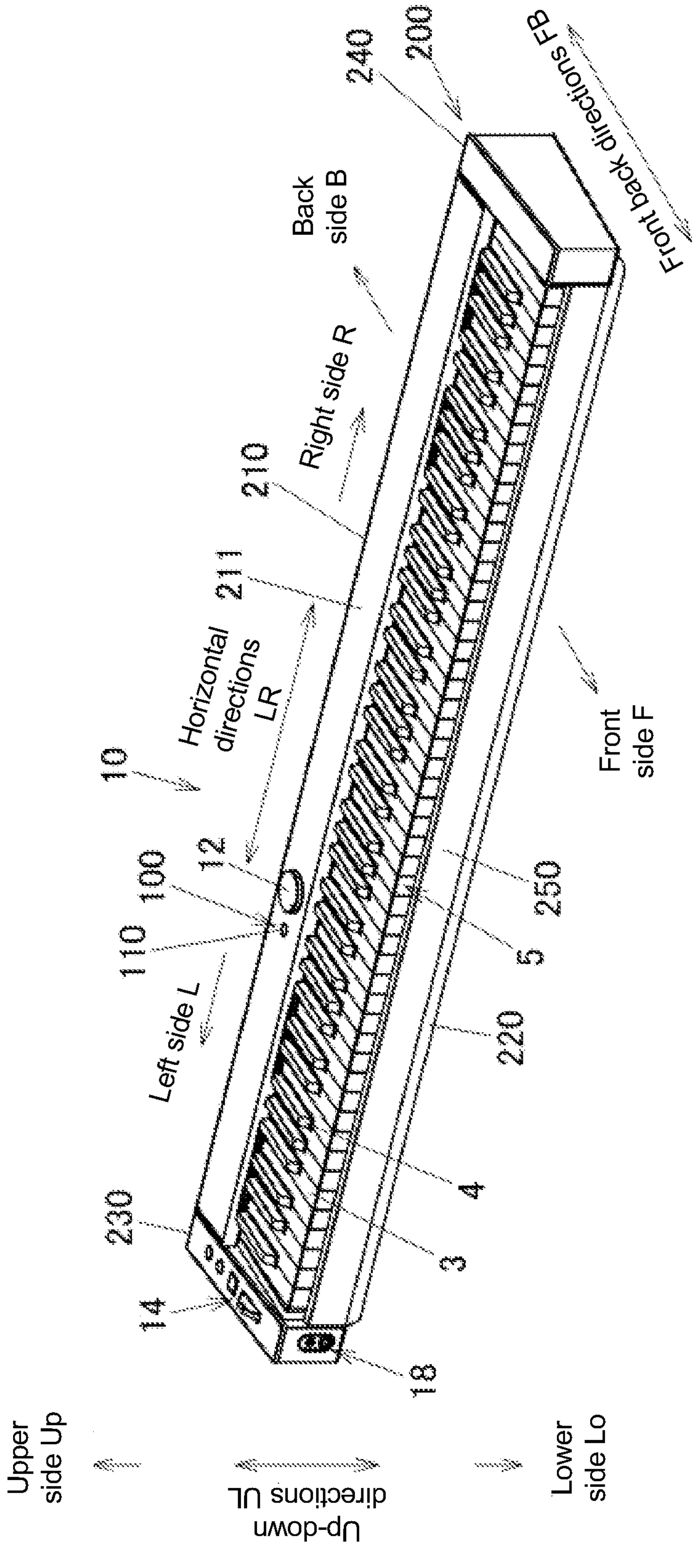
FIG. 1 is a perspective view of an electronic device according to an embodiment of the invention.

Embodiments of the present disclosure will be described below with reference to the drawings. An electronic keyboard instrument 10 shown in FIG. 1 as an electronic device includes a full-size (88-key) keyboard 5 having a plurality of white keys 3 and a plurality of black keys 4 as a plurality of keys, and a case 200. In the following description, in the electronic keyboard instrument 10, with the keyboard 5 placed on the front side, the front side of the keys of the keyboard 5 in the front-back direction FB is referred to as the front side F, the rear side (back side) of the keys in the front-back directions FB is referred to as the back side B, the left side of the keyboard 5 is referred to as the left side L, the right side is referred to as the right side R, the arrangement directions of the plurality of keys of the keyboard 5 are referred to as the horizontal (left-right) directions LR, and in the up-down directions UL of the electronic keyboard instrument 10, the upper side is referred to as upper side Up, and the lower side is referred to as the lower side Lo.

As shown in FIG. 1, the case 200 has an upper case 210, a lower case 220, a left side case 230 and a right side case 240, a plate-like front case 250, and a rear panel (not shown). The upper case 210, the lower case 220, and the front case 250 are elongated in the left-right directions LR. The front side case 250 is provided between the left side case 230 and the right side case 240 on the front side F of the keyboard 5. The upper case 210 is connected to a rear panel (not shown) by a connecting plate 212 (see FIG. 4) provided so as to hang down.

A plate-shaped top panel 211 is provided on the top side of the upper case 210. The left side case 230 is long in the front-rear direction FB and has a substantially rectangular shape when viewed from above. Similarly, the substantially rectangular right side case 240 is arranged adjacent to the right end of the upper case 210 and the right end of the front case 250. The lower case 220 is arranged below the keyboard 5 on the lower sides Lo of the left side case 230, the right side case 240 and the front side case 250.

Figure 2:
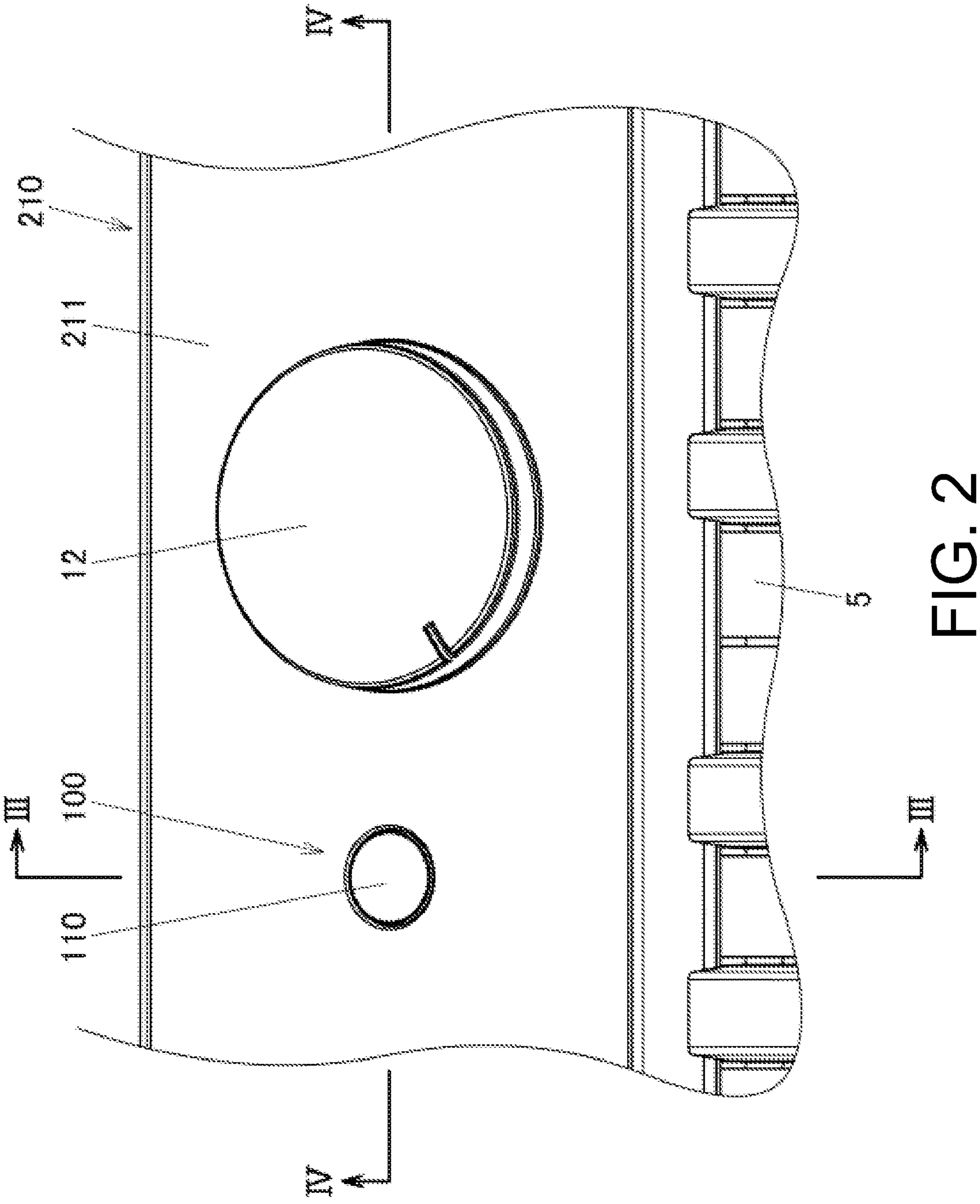
FIG. 2 is an enlarged perspective view showing the periphery of a button device on the top panel of the electronic device according to the embodiment of the present invention.

The left side case 230 is provided with an operation unit 14 having a pitch bender, push buttons, etc., on the upper surface. An earphone jack 18 is provided on the front surface of the left side case 230. Also, as shown in FIGS. 1 and 2, the top panel 211 of the upper case 210 is provided with a rotary knob 12 for adjusting the volume. A button cap 110 of the button device 100 for turning on/off the power is provided on the left side of the rotary knob 12. In other words, the electronic keyboard instrument 10 excluding the button device 100 becomes an electronic device main body driven by the operation of the button device 100.

Figure 3:
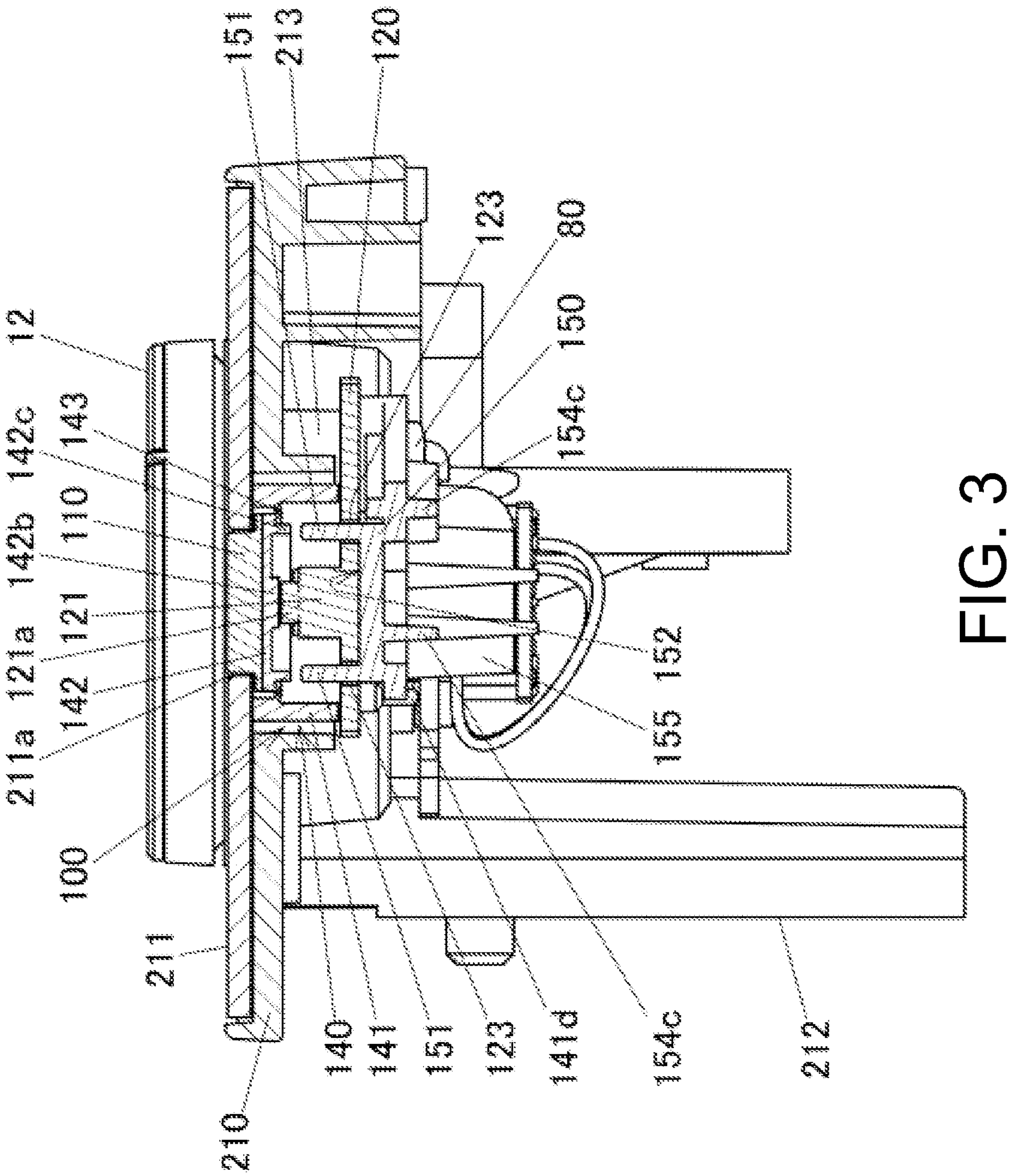
FIG. 3 is a cross-sectional view taken along line III-III in FIG. 2 of the electronic device according to the embodiment of the present invention.
Figure 4:
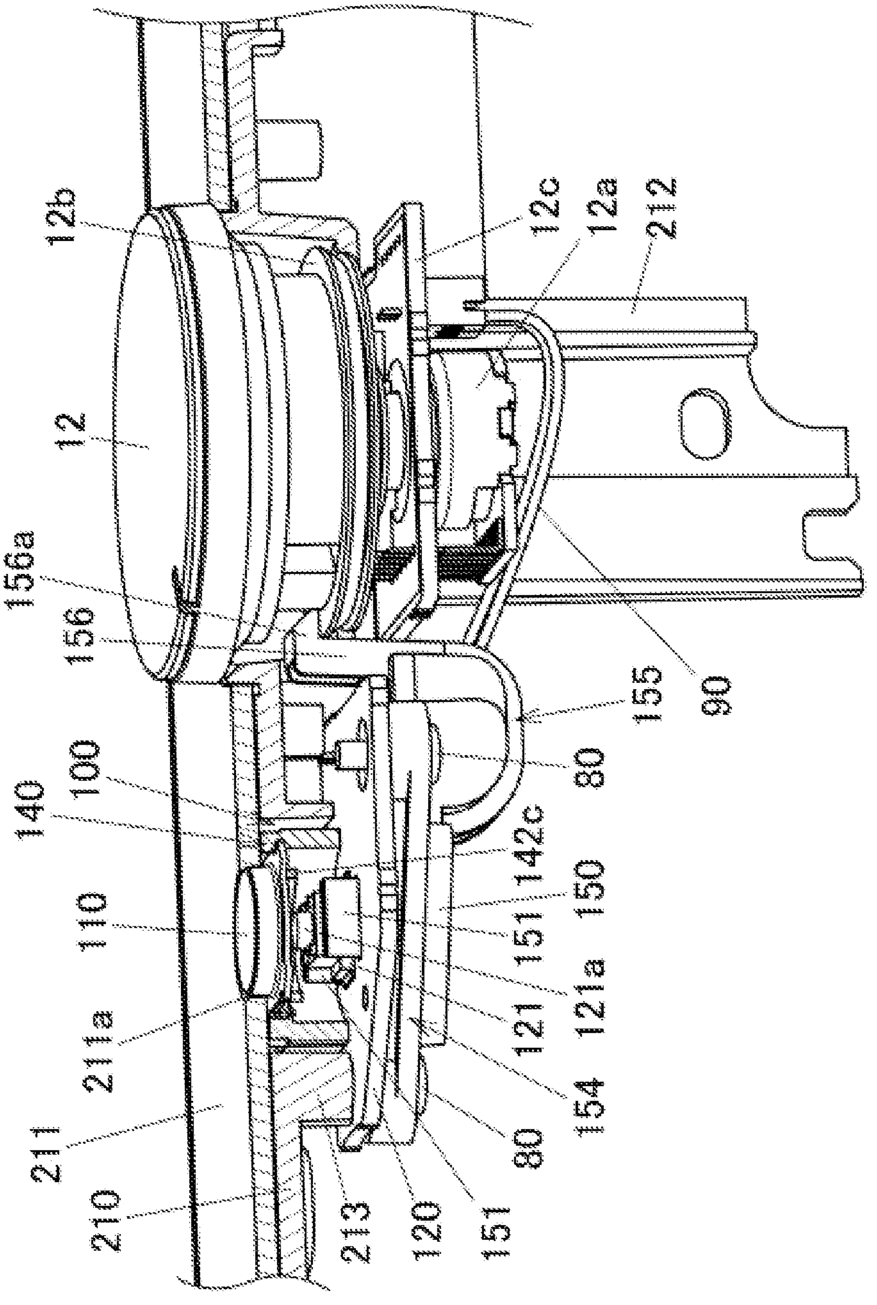
FIG. 4 is a cross-sectional view taken along line IV-IV of FIG. 2 of the electronic device according to the embodiment of the present invention.

As shown in FIGS. 3 and 4, in the button device 100 provided in the electronic keyboard instrument 10, at least a part of the surface (upper surface) of the button cap 110, which is arranged inside the upper case 210 so as to face a button 121*a* that is a pressing portion of a switch element 121 (which will be described later), and which serves as a push button, is exposed through an opening (button cap exposing opening) 211*a* provided in the top panel 211. The button device 100 is provided with a substrate 120 having the switch element 121. As shown in FIG. 4, the substrate 120 is screwed together with a receiving member 150 (to be described later), and is fitted to a boss 213 (partially not shown) provided with two screw members 80 hanging down from the upper surface of the upper case 210 so as to be fixed to the upper case 210.

Figure 5:
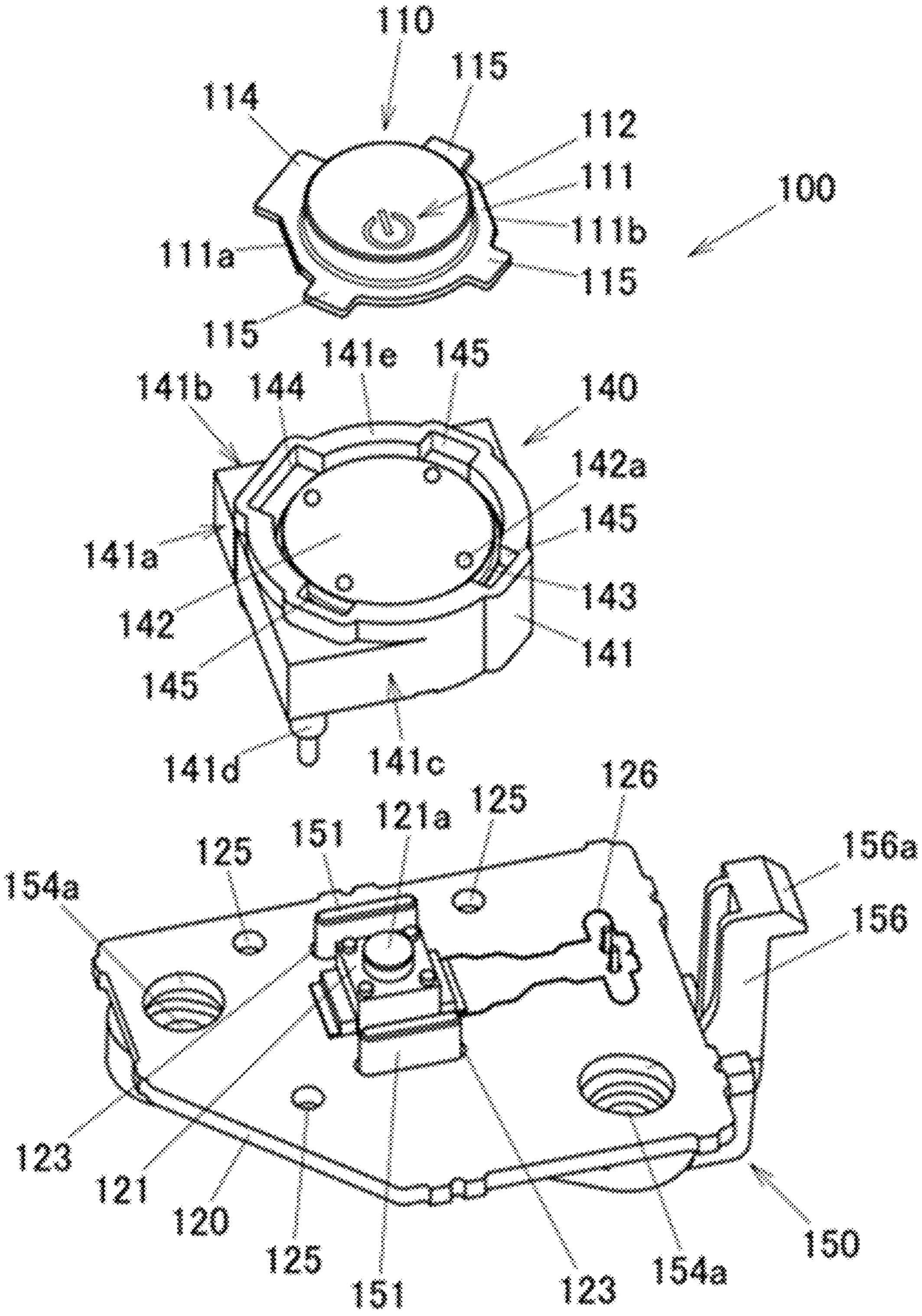
FIG. 5 is an exploded perspective view of the button device according to an embodiment of the present invention.

As the switch element 121 provided on the upper surface of the substrate 120, a tact switch is used in this embodiment. As shown in FIGS. 3, 4, and 5, the switch element 121 is provided with the button 121*a* as a pressing portion, and the power is turned on/off by pressing the button 121*a*. The receiving member 150 is provided on the surface of the substrate 120 opposite to the surface on which the switch element 121 is provided (that is, the lower surface of the substrate 120).

Figure 6:
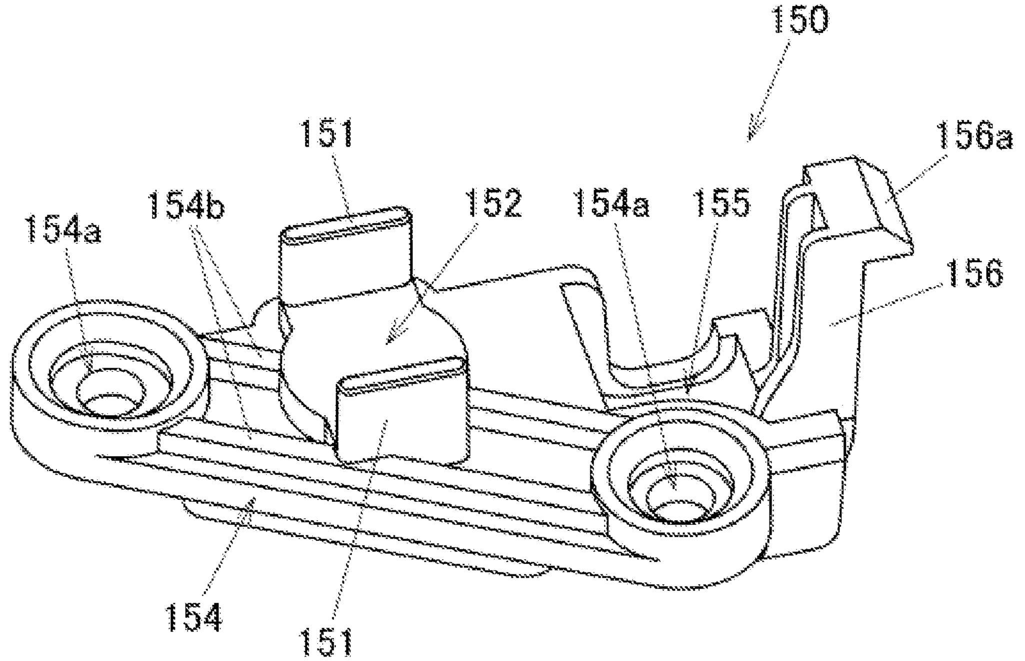
FIG. 6 is a perspective view of a receiving member of the button device according to the embodiment of the present invention.

As shown in FIG. 6, the receiving member 150 has a planar flat portion 152 whose surface extends substantially in the horizontal directions LR and in the substantially front-back directions FB, and two plate-like projecting portions 151 standing on the flat portion 152. In the receiving member 150, the flat portion 152 is arranged below the substrate 120, and the two projecting portions 151 extend above the substrate 120 through two elongated holes 123 provided in the substrate 120, respectively (toward the button cap 110). Here, the button cap 110 is arranged corresponding to the elongated holes 123 which are holes in the substrate 120. Over the substrate 120, the two projecting portions 151 face each other with the switch element 121 interposed therebetween. A pair of two projecting portions 151 sandwiching the switch element 121 is provided corresponding to restricting protrusions 114 and 115 of the button cap 110, which will be described later.

As shown in FIG. 5, while the two projecting portions 151 are provided facing each other across the switch element 121 in the front-back direction FB, on the sides in the horizontal directions LR of the switch element 121, spaces are provided because no protrusions are provided there. That is, on the substrate 120, a hole such as the elongated holes 123 for accommodating the projecting portions 151 is unnecessary at a position corresponding to the side of the switch element 121 in the left-right direction LR, and therefore, a wiring 126 connected to the switch element 121 can be easily routed and arranged on the substrate 120 using such a space. In this embodiment, the wiring 126 is provided on the right side R of the switch element 121. The wiring 126 is provided on the surface side of the substrate 120 where the projecting portions 151 are not provided (that is, the upper surface side of the substrate 120).

Returning to FIG. 6, the flat portion 152 is in contact with the lower surface of the substrate 120 (see FIG. 3). The receiving member 150 includes a substantially triangular base 154 including two screw holes 154*a*. The screw hole 154*a* is provided with a screw hole penetrating in the vertical direction UL at a portion into which a screw is inserted. The projecting portions 151 and the flat portion 152 are provided on the upper surface of the base 154. In addition, two ribs 154*b* are provided on the upper surface of the base 154 so as to extend between the screw holes 154*a* through the flat portion 152. Also, a plurality of ribs 154*c* (see FIG. 3) are provided on the lower surface of the base 154.

The base 154 of the receiving member 150 is reinforced by the ribs 154*b* and 154*c*, and the base 154 reinforces the substrate 120 so as to reduce bending of the substrate 120 when the switch element 121 (button 121*a*) is depressed by the button cap 110. The projecting portion 151 suppresses deformation of the projecting portion 151 itself against the force applied to the button cap 110 in order to prevent the depressed button cap 110 from slipping into the lower surface of the peripheral edge of the opening 211*a* of the top panel 211. To this end, the projection portion is made of a member with a certain degree of rigidity so that it can bounce back. Since it is difficult to directly provide such projecting portions 151 on the flexible substrate 120, the projecting portions 151 are provided on the highly rigid receiving member 150 and directed toward the button cap 110, protruding through the elongated holes 123 of the substrate 120.

A dome-shaped connector cover portion 155 that connects to the base 154 and bulges downward is provided on the side of the receiving member 150 on the side of the rotary knob 12 (see FIG. 4). A substantially bar-shaped knob restricting portion 156 is provided on the outer side of the connector cover portion 155 on the rotary knob 12 side. The knob restricting portion 156 extends upward and has a hook-shaped portion 156*a* at its upper end. On the other hand, as shown in FIG. 4, the rotary knob 12 is provided on a rotating shaft (not shown) of a volume element 12*a* provided inside the upper case 210. The rotary knob 12 is provided with a ring portion 12*b* inside the upper case 210 coaxially with the rotation axis of the volume element 12*a*. The hook-shaped portion 156*a* of the knob restricting portion 156 is engaged with the ring portion 12*b* to prevent the rotary knob 12 from coming off.

The connector cover portion 155 of the receiving member 150 covers a connecting portion at which one end of an electric wire 90 is connected to the substrate 120, the other end of the electric wire 90 being connected to the substrate 12*c* on which the volume element 12*a* is provided.

Also, as shown in FIGS. 3 and 5, an elastically deformable support member 140 is provided between the substrate 120 and the button cap 110 to elastically support the button cap 110. The support member 140 is integrally formed of an elastic rubber material. The support member 140 includes a substantially cylindrical support body portion 141, a button cap mounting portion 142 provided inside surrounded by the inner peripheral surface of the support body portion 141 and on which the button cap 110 is placed, and an elastic hinge portion 143 that connects the inner peripheral surface of the support body portion 141 and the button cap mounting portion 142. The elastic hinge portion 143 is made thinner than the button cap mounting portion 142 so as to be elastically expandable.

The support body portion 141 of the support member 140 has a first side wall surface 141*a* and a second side wall surface 141*b* on the outer circumference, and one end of the first side wall surface 141*a* and one end of the second side wall surface 141*b* are in contact with each other in a substantially perpendicular manner to each other. The other end of the first side wall surface 141*a* and the other end of the second side wall surface 141*b* are in contact with one end and the other end, respectively, of a third side wall surface 141*c* provided in a convex arc shape. The first side wall surface 141*a*, the second side wall surface 141*b*, and the third side wall surface 141*c* forming the outer periphery of the support body portion 141 are all provided substantially perpendicular to the substrate 120. In this manner, the support body portion 141 having the first and second side wall surfaces 141*a* and 141*b*, which are linear in plan view, and the third side wall surface 141*c*, which is arcuate in shape, allows the support member 140 to be arranged on the substrate 120 in a compact manner.

The inside of the support body portion 141 (the inside surrounded by the first side wall surface 141*a*, the second side wall surface 141*b*, and the third side wall surface 141*c*) is provided in a cylindrical shape. Therefore, the support body portion 141 has a large thickness. Fitting pin portions 141*d* are provided on portions on the lower surface where the first side wall surface 141*a*, the second side wall surface 141*b*, and the third side wall surface 141*c* are connected to each other. Three fitting pin portions 141*d* are provided. The fitting pin portion 141*d* has a large-diameter portion on the base side and a small-diameter portion on the tip side, and is press-fitted into each of three fitting holes 125 provided in the substrate 120. The support member 140 is fixed to the substrate 120 by fitting the fitting pin portions 141*d* with the fitting holes 125.

The support body portion 141 has a guide ring 141*e* protruding from the upper surface of the support body portion 141 in a substantially annular shape. Four guide portions 144 and 145 are provided in an elongated rectangular recessed shape on the inner periphery of the guide ring 141*e*. Four guide portions 144, 145 are arranged radially. Of the four guide portions 144 and 145, one guide portion 144 (second guide portion) is wider than the other guide portions 145. The other three guide portions 145 (first guide portions) have substantially the same shape and substantially the same size. The guide portion 144 is a recessed portion that is slightly larger than the restricting protrusion 114 so that the restricting protrusion 114 (second restricting protrusion) described later can be accommodated. The guide portion 145 is a recessed portion that is slightly larger than the restricting protrusion 115 so that the restricting protrusion 115 can be accommodated, and that is slightly smaller than the restricting protrusion 114 so that the restricting protrusion 114 cannot be accommodated into the guide portion 145 by mistake during assembly. By adopting such a structure, a power mark 112, which is an icon provided on the button cap 110, can be arranged in the correct orientation.

The button cap mounting portion 142 has a substantially disc shape. Four small projections 142*a* are provided on the upper surface of the button cap mountings portion 142 to contact the lower surface of the button cap 110. The small protrusions 142*a* are respectively arranged near the guide portions 144 and 145 corresponding thereto. As shown in FIG. 3, on the lower surface of the button cap mounting portion 142, a pressing portion 142*b* projecting in a thin, substantially cylindrical shape is provided at the center facing the button 121*a* of the switch element 121. An annular rib 142*c* is provided in the vicinity of the outer circumference of the lower surface of the button cap mounting portion 142 so as to protrude downward. The annular rib 142*c* is arranged so that portions thereof overlap the projecting portions 151 of the receiving member 150 in a plan view.

The button cap 110 has a thin, substantially cylindrical button cap body, and a flange-shaped annular rib 111 provided on the outer periphery of the button cap body and having a surface continuous with the lower surface of the button cap body. The annular rib 111 is formed in a substantially annular shape. In the button cap 110, the annular rib 111 is provided with four restricting protrusions 114 and 115 each having a long rectangular lateral plate shape (tongue shape) having a predetermined width and each protruding outward from respective portions of the annular rib 111 (specifically, the corresponding portions of the annular rib 111 further protrude in the radial directions of the button cap 110, or so as to further protrude in a direction different from the direction in which the button cap 110 moves when pressed). A plurality of restricting protrusions 114 and 115 are provided so as to be arranged at positions facing each other with the bottom cap body interposed therebetween.

The button cap 110 is entirely made of a transparent material, and the lower surfaces of the button cap 110 and the annular rib 111 (in other words, the surfaces facing the switch element 121) are flat surfaces. The lower surface of the button cap 110 is decorated by printing. Specifically, the power mark 112 is printed in a white color with a black background, for example. A linear portion 111*a* is provided on the outer periphery of the annular rib 111 between the restricting protrusion 114 and one restricting protrusion 115 adjacent to the restricting protrusion 114. A linear portion 111*b* is similarly provided on the outer circumference of the annular rib 111 facing the linear portion 111*a* (the outer circumference of the annular rib 111 between the other two restricting protrusions 115).

Figure 7:
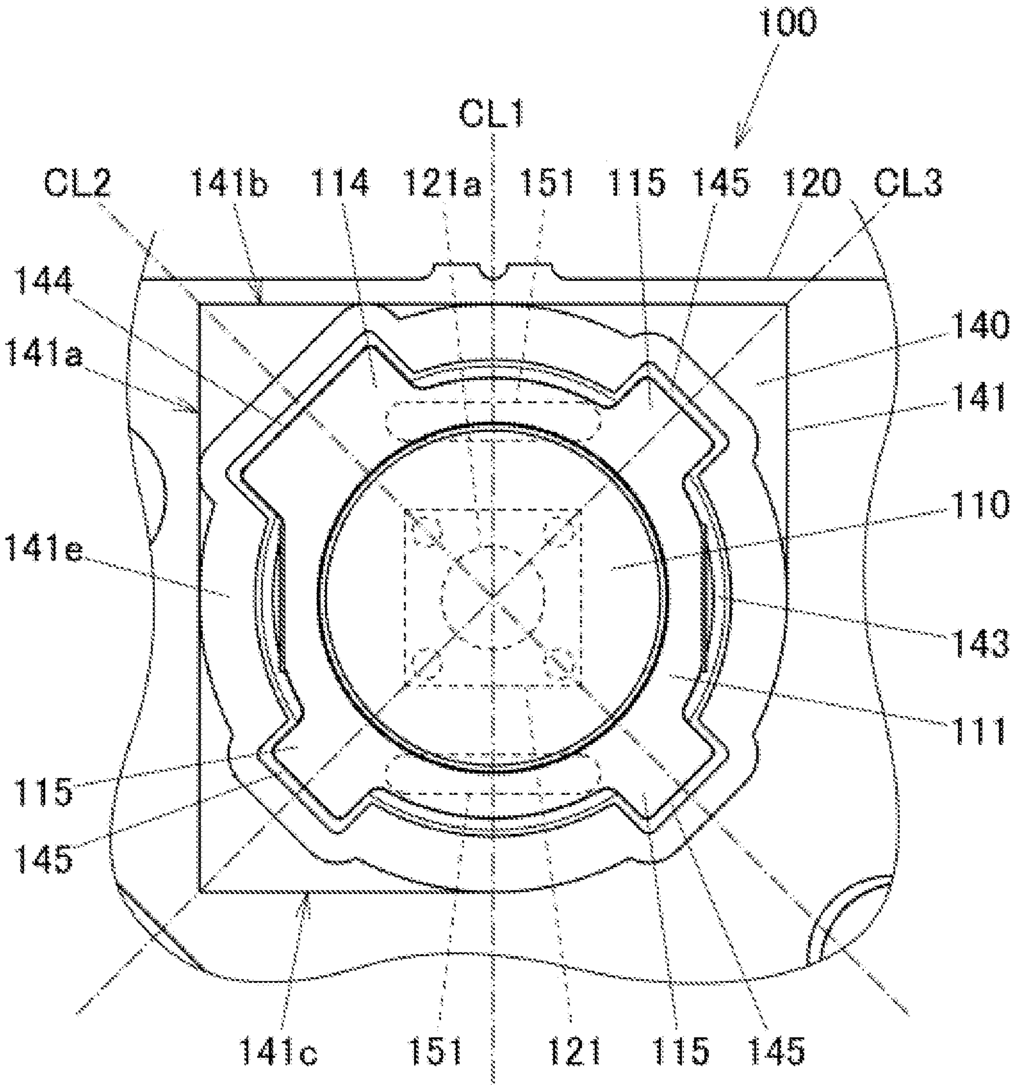
FIG. 7 is a top view of the button device according to an embodiment of the present invention.

FIG. 7 shows the state of the button device 100 in which the button cap 110 is placed on the button cap mounting portion 142 of the support member 140 with the top panel 211 and the upper case 210 being omitted. The wide restricting protrusion 114 (second restricting protrusion having a second length) of the button cap 110 is arranged in the wide guide portion 144 (second guide section) of the support member 140. The other restricting protrusions 115 (first restricting protrusion having a first length) in the button cap 110 are arranged in other guide portions 145 (first guide portion), respectively, of the support member 140. That is, when the button device 100 is assembled, the wide restricting protrusion 114 (the second restricting protrusion having the second width longer than the first width) allows the button cap 110 to be accurately placed on the button cap mounting portion 142 by giving directionality when placing. Since the button cap 110 can be placed accurately in this manner, the button cap 110 can be assembled without making a mistake in the orientation of the power mark 112 (see FIG. 5).

Here, the axial line CL1 is a line parallel to the substrate 120 passing through substantially the central portion in the width direction (horizontal direction) of the two projecting portion 151 indicated by the dashed line in FIG. 7. The axial line CL2 is a line parallel to the substrate 120 and passing substantially the central portion, in the width direction, of the wide restricting protrusion 114 and restricting protrusion 115 facing that restricting protrusion 114 among two sets of restricting protrusions 114 and 115 provided facing each other. Similarly, the axial line CL3 is a line parallel to the substrate 120 and passing through substantially the center portion, in the width direction, of the other two opposing restricting protrusions 115. The restricting projections 114 and 115 are arranged with respect to the projecting portion 151 so that the axes CL2 and CL3 are inclined with respect to the axis CL1 (or rotate at a predetermined angle with respect to the axis CL1 about the intersection point where the axis CL1 intersects). In other words, two pairs of four regulating protrusions 114 and 115 facing each other are arranged as rotated around the axis of the button cap 110 (switch element 121) with respect to the pair of projecting portions 151 facing each other. In this embodiment, the axes CL2 and CL3 are set to incline −45 degrees and 45 degrees with respect to the axis CL1, respectively.

In the button device 100 configured in this way, in the default state of FIG. 3, the small protrusions 142*a* (see FIG. 5) of the button cap mounting portion 142 of the support member 140 are compressed, and the resilient force of the elastic hinge portion 143 urges the button cap 110 upward so that the annular rib 111 contacts and is pressed against the peripheral edge (inner edge) of the inner surface (lower surface) of the opening 211*a* of the top panel 211. Therefore, the annular rib 111 serves as a retainer that can come into contact with the inner edge of the opening 211*a* exposing the surface of the button cap 110, and the annular rib 111 is biased against the inner edge of the opening 211*a* so as to suppress vibrations. As a result, abnormal noise (chattering noise) from the button device 100 is reduced even while the electronic keyboard instrument 10 is being played. In addition, when a light source is provided inside the upper case 210 so that the transparent button cap 110 is illuminated, the circular rib 111 whose lower surface is black can prevent leakage of light through the gap between the outer periphery of the button cap 110 and the opening 211*a*.

Figure 8:
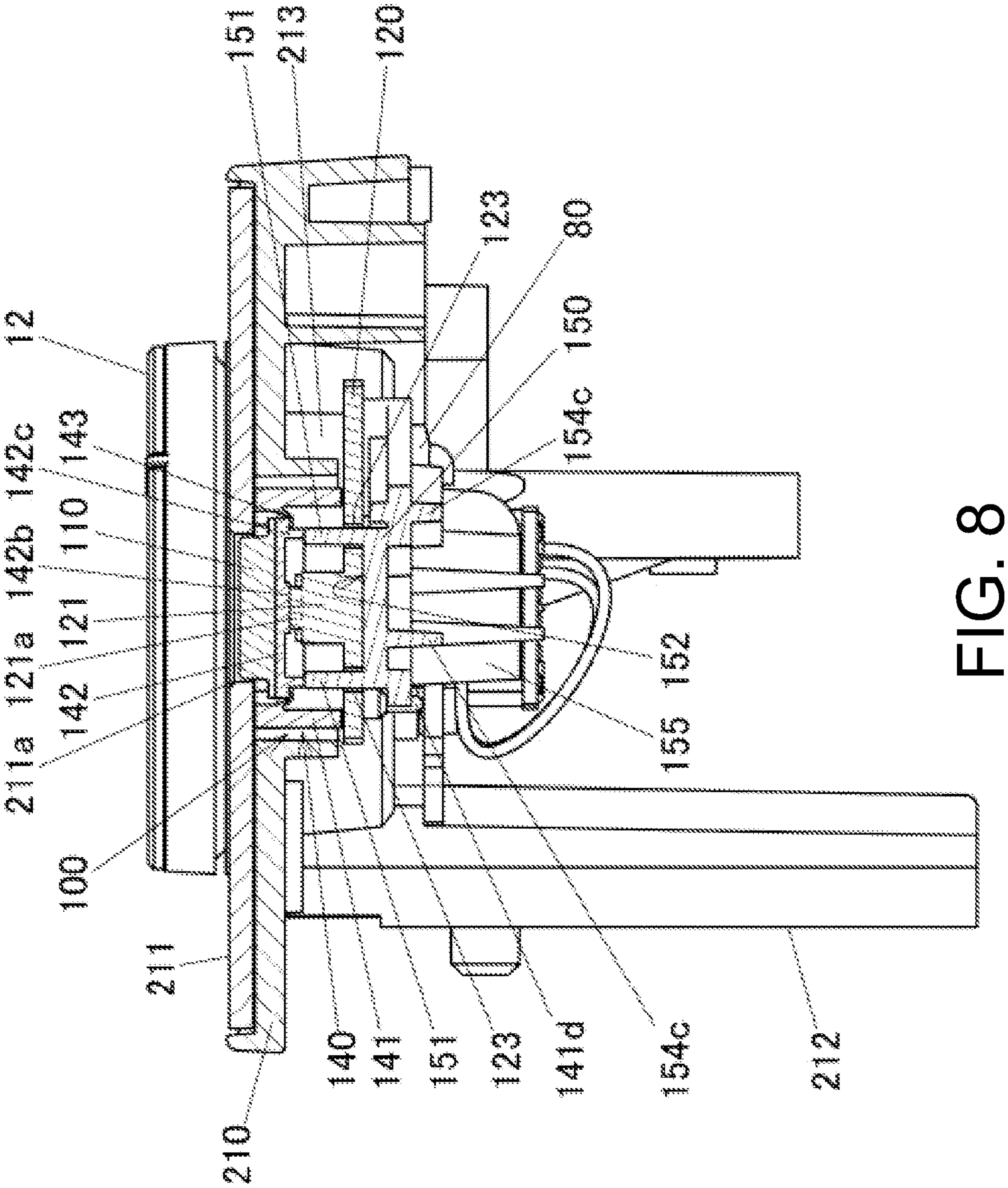
FIG. 8 is a cross-sectional view corresponding to the III-III cross section of FIG. 2, showing a state in which the button cap is pressed in the button device according to the embodiment of the present invention.

Then, as shown in FIG. 8, when the button cap 110 is pressed, the button cap mounting portion 142 of the support member 140 descends together with the button cap 110, and the pressing portion 142*b* of the button cap mounting portion 142 moves toward the switch element 121 and presses the button 121*a*. At this time, the elastic hinge portion 143 is stretched. Also, at this time, the annular rib 142*c* of the button cap mounting portion 142 abuts against the projecting portion 151, imparts a predetermined elastic force to the button cap 110, and makes the user feel resistance (click feeling) thereby making the user realize that the switch element 121 is operated. Then, when the finger that pressed down the button cap 110 is released, the button cap 110 is lifted by the restoring force of the elastic hinge portion 143, and the default state of FIG. 3 is restored.

Figure 9:
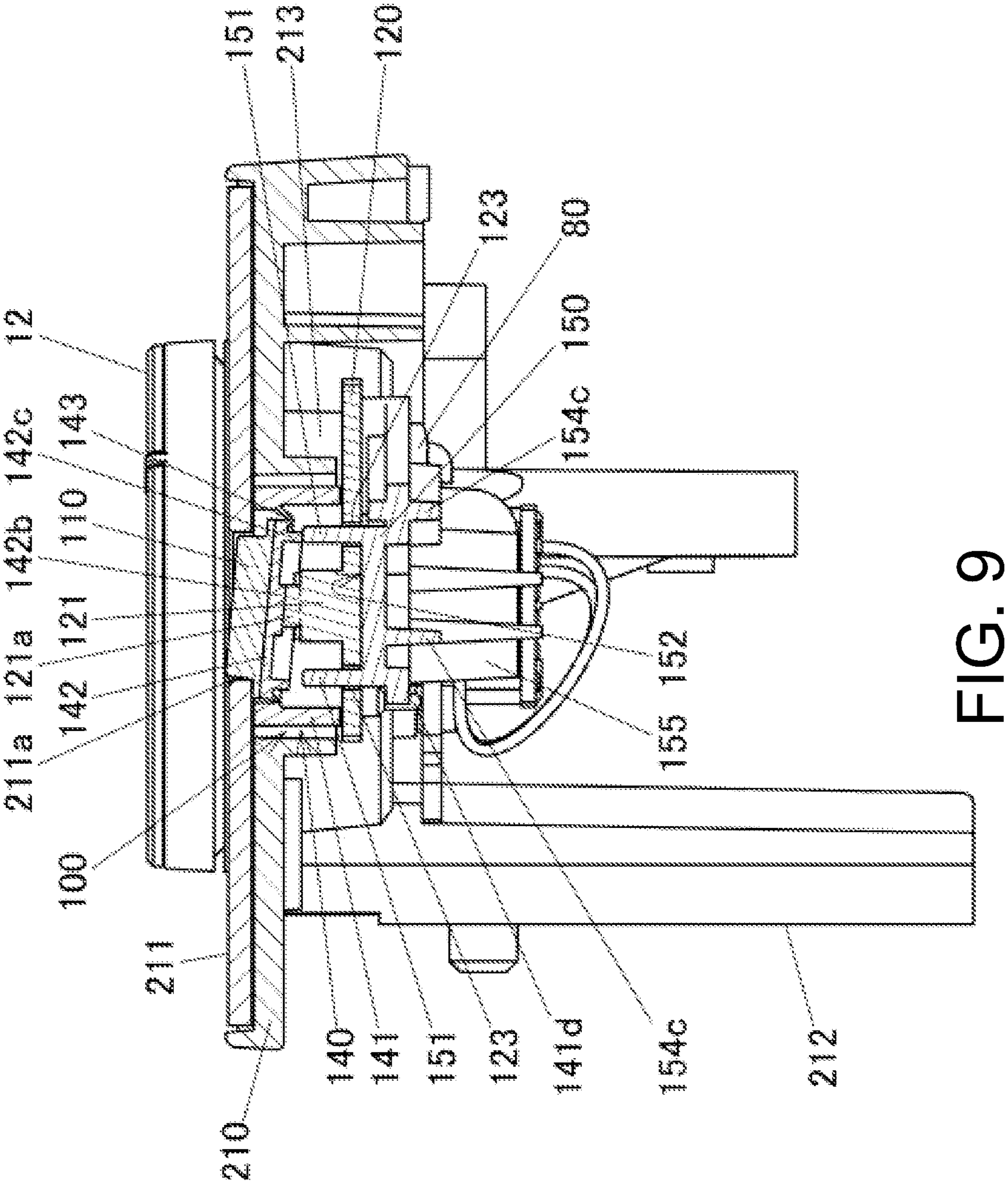
FIG. 9 is a cross-sectional view corresponding to the III-III cross section of FIG. 2, showing a state in which the button cap is obliquely pressed in the button device according to the embodiment of the present invention.
Figure 10:
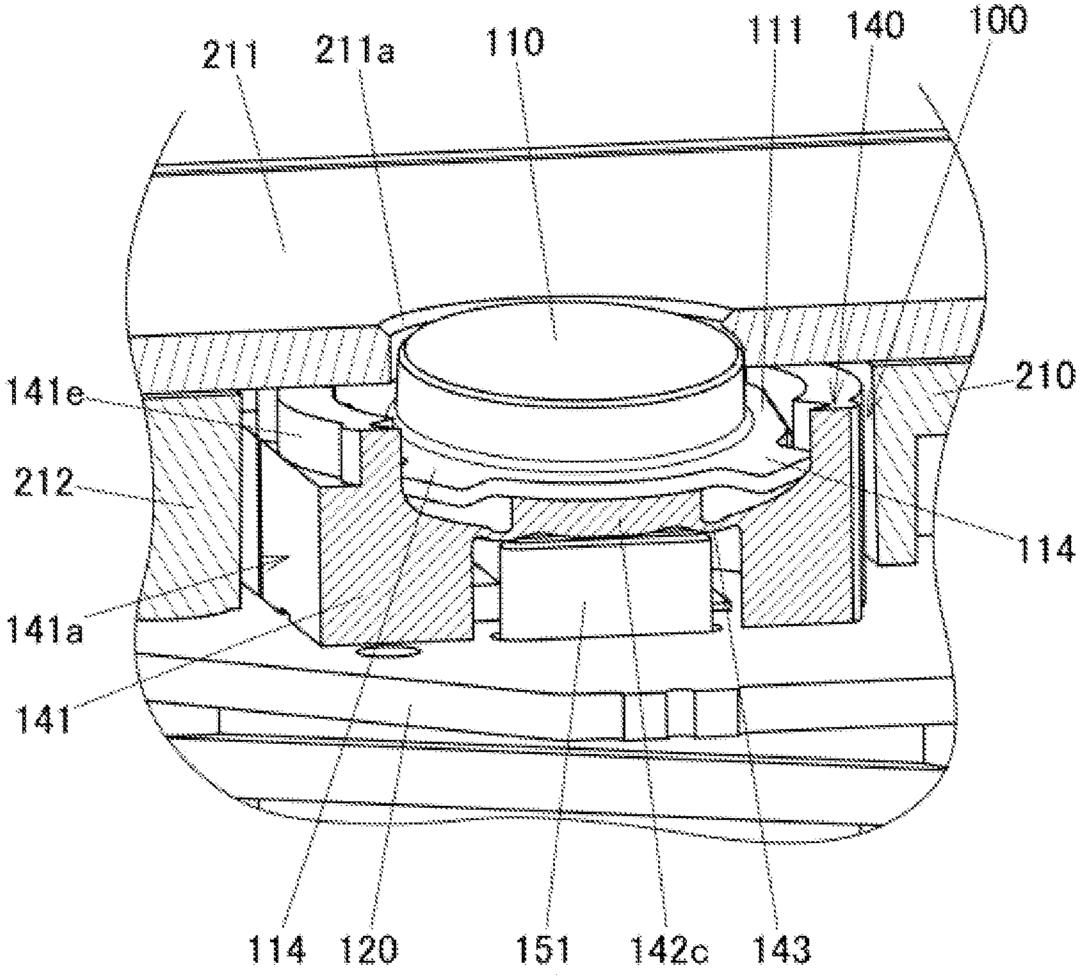
FIG. 10 is a cross-sectional perspective view showing an enlarged button periphery, corresponding to the IV-IV cross section of FIG. 2, showing a state in which the button cap is obliquely pressed in the button device according to the embodiment of the present invention.

As shown in FIG. 9, when the button cap 110 is pressed obliquely by the user pressing a part of the periphery of the button cap 110 or applying force to the button cap 110 in a direction significantly inclined with respect to the vertical direction UL, the restricting protrusions 114 and 115 and the projecting portions 151 of the button cap 110 prevent the button cap 110 from slipping into the lower peripheral edge of the opening 211*a* of the top panel 211. For example, when the button cap 110 is tilted forward and pressed, as shown in FIGS. 9 and 10, the button cap mounting portion 142 including the annular rib 142*c* contacts the projecting portion 151, and the repulsive force of the projecting portion 151 exerts an upward force on the button cap 110 to push it back. Therefore, it is possible to prevent the edge portion of the button cap 110 from being caught in the peripheral portion of the opening 211*a* on the lower surface of the top panel 211.

On the other hand, on the side corresponding to the projecting portion 151 on the opposite side, an upward force is applied to the button cap 110 due to the reaction of sinking or the reaction due to the repulsive force, but the laterally projecting restricting projections 114 and 115 are the first to contact the lower surface of the top panel 211. Because of this, it is possible to prevent the button cap 110 from coming off upward from the opening 211*a*. In this way, by arranging the two elongated projecting portions 151 so as to easily contact the button cap 110 that is pushed in at an angle, the button cap 110 is less likely to slip into any area around the button cap 110. Further, even if the button cap 110 is pushed in at a position corresponding to a portion where the projecting portion 151 is not arranged, because the support member 140 located directly below one of the laterally projecting restricting projections 114 and 115 likely abuts on the projecting portion 151, it is possible to reduce the slippage of the button cap 110 as well. Here, since the support member 140 is arranged below the button cap 110, the button cap 110 does not come into direct contact with the projecting portion 151. Alternatively, the button cap 110 may be configured to make direct contact with the projecting portion 151 via a through hoe provided in a part of the support member 140.

In this way, when the support member 140 is elastically deformed as the button cap 110 is pressed down, the projecting portions 151 support the button cap 110 via the supporting member 140 so as to prevent the surface of the button cap 110 from slipping under the inner edge of the opening 211*a* of the top panel 211.

As described above, according to the embodiment of the present disclosure, even when the button cap 110 is pressed obliquely, the projecting portions 151 can restrict the downward movement of the button cap 110, so that the button cap 110 can be prevented from being pushed into the periphery of the opening 211*a*. Since the projecting portions 151 do not interfere with the switching operation of the button cap 110, the button cap 110 can be easily operated.

Further, the substrate 120 is provided with the support member 140 that elastically supports the button cap 110. The button cap 110 is provided with the annular rib 111 and the restricting protrusions 114 and 115, which are a retaining portion that can come into contact with the inner edge of the opening 211*a* where the surface of the button cap 110 is exposed. This reliably prevents the button cap 110 from coming off. In addition, the annular rib 111 may be a plurality of projections or the like instead of having a flange shape.

In addition, the retaining portion is the flange-like annular rib 111 having a dark lower surface so that light is less likely to pass through. As a result, even if light is applied from the inside of the case 200 to the button cap 110 whose lower surface is partially transparent, light leakage from the gap between the opening 211*a* and the button cap 110 can be prevented, thereby providing superior appearance of the button device 100.

The support member 140 includes the cylindrical support body portion 141, the button cap mounting portion 142 provided on the inner peripheral portion of the support main body portion 141 and on which the button cap 110 is placed, and the elastic hinge portion 143 that connects the outer periphery of the button cap mounting portion 142 with the inner peripheral surface of the support body portion 141, and is integrally formed of a rubber material that is an elastic material. As a result, the button device 100 having a simple structure and being easy to assemble can be provided.

In addition, the projecting portions 151 each have a plate shape and are arranged so as to face each other with the switch element 121 interposed therebetween, and two pairs of the restricting protrusions 114 and 115 are provided so as to face each other. As shown in FIG. 7, when the button device 100 is viewed from above, the axial lines CL2 and CL3 of the restricting protrusions 114 and 115 parallel to the board 120 are inclined with respect to the axial line CL1 of the projecting portions 151 parallel to the board 120. As a result, the button cap 110 and the receiving member 150 have a simple structure, and the button device 100 can be easily assembled.

In addition, the restricting protrusions 114 and 115 are provided in a plate shape with a predetermined width in which the restricting protrusion 115 as a first restricting protrusion has a first length, and the restricting protrusion 114 as a second restricting protrusion has a second length longer than the first length. As a result, the button device 100 can be assembled without fail even if the button cap 110 has directionality.

In addition, the button cap 110 has a flat surface facing the switch element 121. As a result, it is possible to perform decoration such as printing on the lower surface of the button cap 110 while preventing the penetration of the button cap 110.

By providing the electronic keyboard instrument 10 with the button device 100, the power button can be easily operated, and the electronic keyboard instrument 10 can be provided as the button cap 110 that are less prone to slipping.

In the above embodiment, the button device is applied to turn on/off the power, but the present invention is not limited to this and may be applied to a rotary knob such as a volume.

In the above embodiments, an electronic keyboard instrument was exemplified as an electronic device, but the present invention is not limited to this, and is applicable to home and office electronic equipment, such as personal computers, printers, electronic calculators, electronic dictionaries, PDA (Personal Digital Assistant) display devices, wristwatches, and table clocks, etc.

It will be apparent to those skilled in the art that various modifications and variations can be made in the present disclosure without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A button device, comprising:
a substrate with a hole;
a button cap arranged above the substrate in a position corresponding to the hole in the substrate;
a projecting portion protruding toward the button cap through the hole in the substrate;
a support member that is arranged between the substrate and the button cap to support the button cap; and
a switch element provided on the substrate,
wherein the support member includes an opposing surface that faces the projecting portion and applies a load to the projecting portion without applying a load to the substrate when the button cap is pressed,
wherein the projecting portion is provided in a pair, each of the pair of the projecting portions has a plate-like shape, and the pair of the projection portions face each other with the switch element interposed therebetween, and
wherein the substrate is provided with a wiring connected to the switch element on a side of the switch element on which the projecting portions are not provided.

2. The button device according to claim 1, further comprising a panel having an opening that exposes at least a portion of the button cap,
wherein the button cap includes a retaining portion that can come into contact with an inner edge of the opening in the panel.

3. The button device according to claim 2,
wherein the support member is elastically deformable, and
wherein the projecting portion is configured to support the button cap through the support member so as to prevent a surface of the button cap from slipping under an inner edge portion of the opening in the panel when the supporting member is elastically deformed as the button cap is pressed.

4. The button device according to claim 3, wherein the support member includes a cylindrical support body portion, a button cap mounting portion provided inside the support body portion surrounded by an inner peripheral surface of the support body portion and on which the button cap is placed, and an elastic hinge portion connecting said inner peripheral surface of said support body portion with an outer periphery of the button cap mounting portion.

5. The button device according to claim 1,
wherein the hole is provided in a plurality in the substrate, and the projecting portion is provided in a plurality,
wherein the button cap has a button cap body and a plurality of restricting protrusions protruding horizontally and outwardly from respective portions of the button cap body, the plurality of restricting protrusions being provided to face each other across the button cap body, and
wherein an axial line passing through central portions of the restricting protrusions that face each other is inclined with respect to an axial line passing through central portions of the plurality of projecting portions.

6. The button device according to claim 5, wherein the plurality of restricting protrusions include a first restricting protrusion having a first length and a second restricting protrusion having a second length longer than the first length.

7. The button device according to claim 1, wherein the button cap has a flat surface facing the switch element.

8. An electronic device, comprising:
the button device as set forth in claim 1; and
an electronic device main body driven by an operation of the button device.

9. The button device according to claim 1,
wherein the support member includes a fitting pin having a large-diameter portion on a base side of the fitting pin and a small-diameter portion on a tip side of the fitting pin, and
wherein the substrate includes a fitting hole configured to fit the fitting pin.

10. The button device according to claim 1,
wherein the substrate includes a plurality of fitting holes and,
wherein the support member includes a plurality of fitting pins configured to fit in the plurality of fitting holes, respectively, the support member having a plurality of corners the number of which is equal to or greater than the number of the plurality of fitting holes.

* * * * *